Dec. 29, 1964  R. D. SCHULTZ  3,163,062
TOOL HOLDERS
Filed July 25, 1962  2 Sheets-Sheet 2
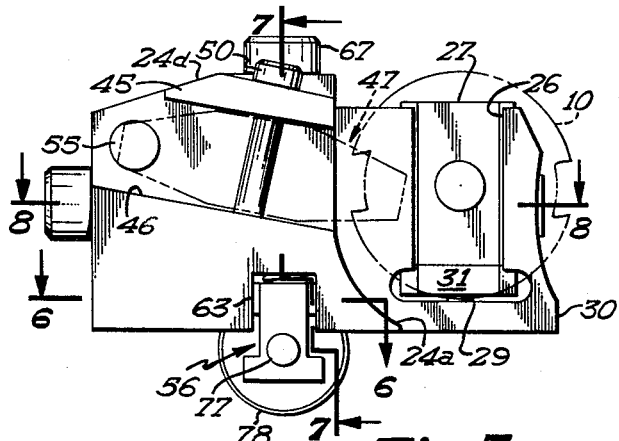
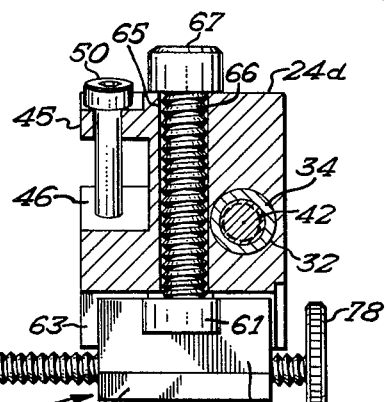
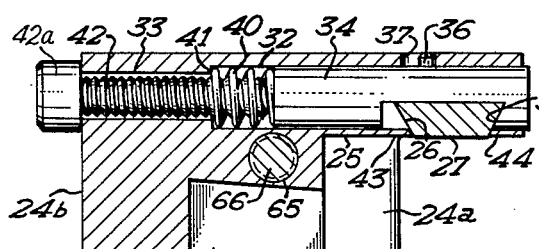
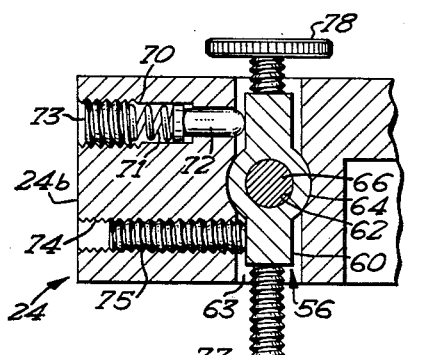
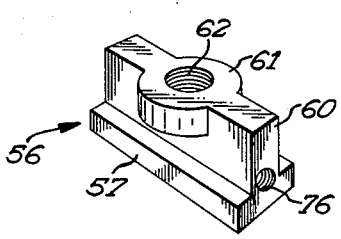
INVENTOR.
RODNEY D. SCHULTZ
BY Joseph E Ryan
ATTORNEY

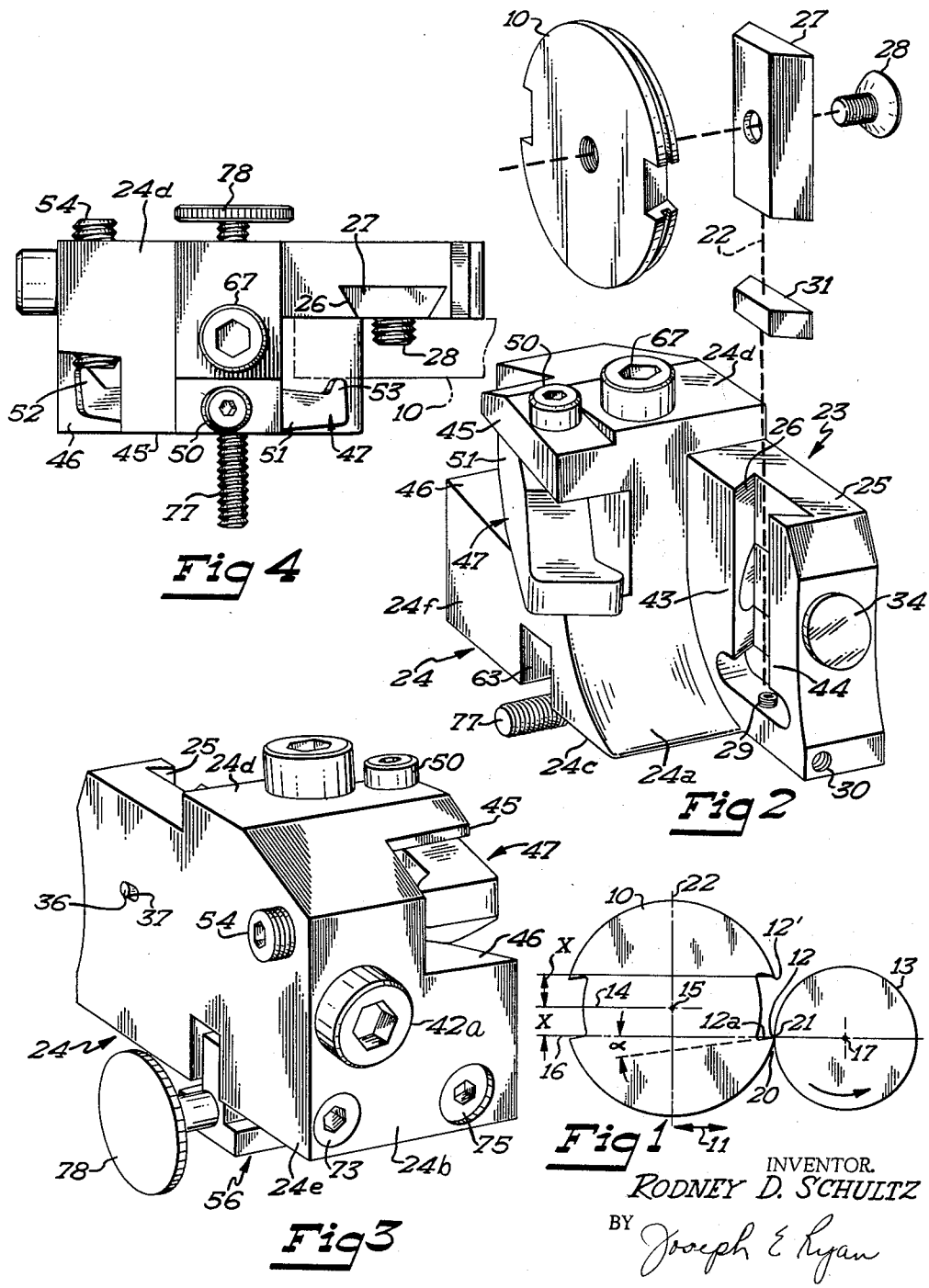

United States Patent Office 3,163,062
Patented Dec. 29, 1964

3,163,062
TOOL HOLDERS
Rodney D. Schultz, Brooklyn Center, Minn., assignor to Honeywell Inc., a corporation of Delaware
Filed July 25, 1962, Ser. No. 212,332
8 Claims. (Cl. 82—36)

This invention relates to tool holders and more particularly to a fixture for holding a stationary tool for performing machining operations upon a rotating work piece.

In many industrial machining operations, it has been found that a very high proportion of the time, often nearly 50 percent, is spent with the machine shut down. This shutdown time results in a substantial financial loss in that an expensive machine is standing idle and also, in many instances, the operator's time is lost. Such shutdown time is due to the fact that it generally requires a rather large initial setup time for the machining job and also a substantial amount of time is generally required to adjust the tool in the holder whenever it is necessary to remove the tool for grinding or to replace it with a new one.

Initial setup usually involves mounting of the tool holder on the cross-slide or similar movable member of the machine which is adapted to be advanced either manually or automatically to move the tool into the work piece. This mounting is, in many instances, accomplished by having a T-block extending from the tool holder inserted into a corresponding groove in the cross-slide, the groove extending parallel to the axis of the work piece. In previous tool holders, adjustment of the holder along this groove could often be accomplished only by tapping it with a hammer or similar tool. This resulted in inaccurate positioning and often a considerable amount of time was required to obtain even a reasonably accurate longitudinal adjustment of the tool holder with respect to the cross-slide.

In most instances the only way to determine whether a satisfactory longitudinal adjustment has been obtained is to start the machine and run a sample part. If the adjustment is not satisfactory, the part must be discarded and the tool readjusted. Often several sample parts are run and discarded before a satisfactory adjustment is obtained. Obviously, this results in large shutdown times, high labor costs, and waste of materials, thereby greatly increasing the total cost of the machining operation.

In addition, when the tool is mounted on the tool holder, it is extremely important that the position of the tool be adjusted to ensure that the cutting edge of the tool engages the work piece at a particular predetermined position, substantially on a line through the center of rotation of the work piece and parallel with the axis of movement of the cross-slide. When the cutting surface of the tool is not positioned so as to engage the work piece on the center as described above, it has been found that tool life is decreased greatly, and in addition the quality of the machining falls off. With conventional tool holders, accurate adjustment has been extremely difficult, if not impossible, to obtain. This is particularly true in multiple spindle machines where a number of tool holders are required and wherein they are often located in positions which are extremely difficult to reach into and very difficult to see. This is often further complicated by the fact that cutting fluid is used and although, of course, the machine is shut off during any time it is being set up or the tool is being changed, the interior of the machine and also the tool holder and tool itself are often covered with cutting fluid, thus tending to make it even more difficult for the operator to make complicated adjustments.

The time required for removal and replacement of tools has been reduced somewhat by the use of circular tools having a plurality of cutting surfaces ground thereupon. Thus, when the tool needs sharpening, it can be removed from the holder and rotated to a position so that a new cutting surface is available. However, with this arrangement, a considerable amount of time is still required for centering the tool. In addition, when a rather large tool is used, it has been found that the tool, which is normally mounted by a member extending through its center, tends to rotate due to the large torques set up during the machining operation. In the past, it has been necessary to provide apertures in the tool and a corresponding pin on the tool holder or other member cooperating therewith to prevent rotation of the tool. With this arrangement, when the tool needed sharpening, it had to be ground to a position where another of the apertures would align with the pin. This often resulted in grinding away a large portion of the tool.

I have provided a tool holder wherein many of the shortcomings of prior tool holders have been overcome. By using a pre-set tooling principle, initial setup time is reduced and, after initial setup, tools may be changed or replaced without any adjustment of the tool position. Experiments have shown that initial setup time, using my tool holder, is as much as 66 percent less than that required with conventional tool holders. Tool installation time after set up is reduced as much as 83 percent.

It is therefore an object of my invention to provide a novel tool holder for adjustably holding a machine tool and which largely overcomes many of the shortcomings of the previously known devices.

It is another object of my invention to provide a tool holder having novel features which facilitate rapid and relatively easy adjustment of the tool with respect to the work piece, thus reducing job setup time.

A further object of my invention is to provide a tool holder which, after initial setup, facilitates rapid removal and replacement of the tool.

Another object of my invention is to provide a tool holder wherein, after initial setup, no centering is required when the tool is removed for sharpening and then replaced or when one tool is replaced by a similar tool.

Another object of my invention is to provide a simplified, yet positive, means for locking the tool to prevent movement thereof with respect to the holder.

A still further object of my invention is to provide a tool holder as described above, which is compact, relatively low in cost, and readily adaptable for use with conventional industrial machines.

These and other objects of the invention will become apparent upon reading the following detailed description of the preferred embodiment of my invention in conjunction with the accompanying drawings wherein:

FIGURE 1 is a schematic view of a fixed cutting tool and a rotating work piece showing the desired relative positions thereof.

FIGURE 2 is a perspective view of my tool holder taken substantially from the front thereof and having certain portions in exploded form.

FIGURE 3 is a view of my improved tool holder in perspective and taken substantially from the rear.

FIGURE 4 is a top view of the tool holder.

FIGURE 5 is a side view of my tool holder, as seen from the left of FIGURE 1, with certain portions shown in phantom outline.

FIGURE 6 is a longitudinal cross-sectional view of my tool holder taken substantially along line 6—6 of FIGURE 5 with portions broken away.

FIGURE 7 is a transverse cross-sectional view taken substantially along line 7—7 of FIGURE 5.

FIGURE 8 is a longitudinal cross-sectional view taken substantially along line 8—8 of FIGURE 5.

FIGURE 9 is a perspective view of a T-block which forms a part of my tool holder.

Referring to FIGURE 1, reference numeral 10 generally designates a circular cutting tool mounted for movement along an axis 11 to bring a cutting surface 12 into and out of engagement with a rotating work piece 13. A line 14 passes through the center 15 of tool 10 and is parallel to axis 11. Line 16 passes through the center of rotation 17 of work piece 13 and is parallel to axis 11 and line 14. In order to assure proper clearance or relief 20 between the tool and the work piece, it is necessary that cutting surface 12 be located at some distance $x$ below the center of the tool. This distance $x$ will, of course, be dependent upon the diameter of tool 10. Cutting face 12a of tool 10 forms a back rake angle $\alpha$ with line 16. In order to assure accurate machining and also to obtain maximum tool life, it is necessary that cutting surface 12 of the tool 10 intersect the work piece 13 as nearly as possible to a point 21, which is the point of intersection of line 16 and the circumference of the work piece.

As shown in FIGURE 1, work piece 13 rotates in a counterclockwise direction about its axis 17. In some circumstances, it may be desirable, after the job has been set up, to rotate the work piece in the opposite direction. If this is the case, surface 12′ may be provided on tool 10, or on a similar tool, and located a distance $x$ above line 14 through the center of the tool. Then it is necessary only to move tool 10 downward along an axis 22 a distance $2x$ and so bring cutting surface 12′ into a position where it will engage work piece 13 at point 21.

As will be described hereinafter, my invention provides a tool holder wherein one of the advantages is that it provides easy and accurate adjustment of the position of the cutting tool along axis 22 upon initial setup for a machining job and thereafter, the tool may be removed for sharpening and replaced or it may be replaced by a similar tool without requiring any adjustment of its position along axis 22. In addition, as will also be described hereinafter, my tool holder provides for a rapid adjustment of the position of the tool along axis 22 should the direction of rotation of the work piece be reversed.

Referring now to FIGURES 2 through 8, reference numeral 23 generally designates the body of my tool holder. Body 23 has a main block or body portion 24 which is in the form of a generally rectangular block having a front side 24a which, when the tool holder is mounted on a machine tool, is adjacent the work piece. Opposite front 24a, and remote from the work piece, is rear wall 24b. Portion 24 further has a base or bottom wall 24c which is normally mounted adjacent the cross-slide of the machine tool, as will be explained hereinafter. Remote from wall 24c is a top wall 24d which may include two surfaces intersecting at an obtuse angle, as seen in FIGURES 3 and 5. As viewed from the usual operating position (from the rear), body 24 also has a left side 24e and a right side 24f.

A tool carrying flange or leg 25 of substantially rectangular cross section and of a substantially narrower width than the main portion 24 extends longitudinally from front surface 24a and has one side coexistive with side 24e. A dovetail slot 26 is formed in flange 25 substantially parallel to front surface 24a and is adapted to accept a similar but slightly smaller dovetail mounting block 27. Block 27 is adapted to carry a cutting tool, such as circular cutting tool 10, which is mounted thereon by a screw 28 or other appropriate means. The vertical position, along axis 22, of block 27 in slot 26 may be adjusted by the use of adjustment screw 29 which is threaded into flange 25 at the lower end of slot 26 and extends into the end of the slot 26 to abut the lower end of block 27 when it is inserted into the slot. Additional adjustments of block 27 in slot 26 may be obtained by inserting a riser block 31 between screw 29 and block 27. Riser block 31 may be of a height $2x$ to provide adjustment as described previously in connection with FIGURE 1.

As best seen in FIGURE 8, a cylindrical opening 32 extends longitudinally through flange member 25 and into main body portion 24 where it terminates in a cylindrical opening 33 which is coaxial therewith and of a somewhat smaller diameter and which extends through member 23 to the other side 24b of the block. Opening 32 is positioned in flange 24 so as to intersect dovetail slot 26 and so that about one-half of the cross-sectional area of opening 32 is coextensive with slot 26. A cylindrical plunger or clamping member 34, being somewhat shorter in length than the depth of cylindrical opening 32, has a dovetail slot 35 formed therein. Dovetail slot 35 is similar to slot 25 except that it has slightly larger dimensions. Plunger 34 is inserted into opening 32 and is retained therein by a pin 36 which is inserted into an aperture in member 34 after the plunger is mounted in opening 32 and which projects therefrom into an elongated slot 37 formed in flange 34 adjacent opening 32. Pin 36, operating in slot 37, permits limited axial movement of plunger 34 with respect to the body and retains plunger 34 in a rotational position such that in one of its axial positions, slot 35 is coextensive with slot 26 of flange 25. A spring 40 disposed within opening 32 abuts, at one end, a shoulder 41 adjacent opening 33, and at its other end abuts the end of plunger 34. Spring 40 thus normally retains plunger 34 in an axial position wherein slot 35 is coextensive with slot 26. A clamp screw 42 having its head 42a adjacent rear wall 24b, extends through opening 33, is encircled by spring 40 and is threaded into a threaded aperture (not shown) in plunger 34. Thus, while plunger 34 is normally biased outwardly from opening 32 to a position wherein pin 36 engages the forward end of slot 37, its axial position may be adjusted, within the limits allowed by the length of slot 37, by turning clamp adjustment screw 42 within the threaded aperture of the plunger.

When it is desired to mount a tool such as circular tool 10 on the tool holder, clamp adjustment screw 42 is withdrawn so as to allow plunger 34 to advance to the position wherein slot 35 is coextensive with slot 26. Dovetail block 27, on which is mounted tool 10, is then inserted in slot 26 and its height adjusted by adjustment screw 29. Adjustment screw 30 is then tightened against screw 29 to lock it in place. Dovetail block 27 is then locked securely in slot 26 by tightening adjustment screw 42, thus drawing plunger 34 into opening 32. This causes block 26 to be engaged by the forward edge of slot 35 in the plunger, thus locking it in place. At the same time, since slots 26 and 35 are slightly larger than block 27, the block is drawn into the dovetail slots, thereby causing the flat side of tool 10, adjacent the dovetail block, to be brought into abutment with surfaces 43 and 44 of flange portion 24 adjacent dovetail slot 26. This prevents rotation of tool 10 about an axis through its center and with respect to the dovetail block and the tool holder.

An additional means for clamping tool 10 in place and preventing rotation thereof with respect to the tool holder is also provided and will be described hereinafter. A portion is removed from the side 24f of main body member 24, leaving an upper shoulder portion 45 and a lower shoulder portion 46 substantially parallel to each other and having an elongated space therebetween. A clamping lever 47, to be described hereinafter, is pivotally mounted substantially at its center between shoulders 45 and 46 by a pin 50 having its head adjacent top wall 23d and extending through an aperture (not shown) in shoulder 45, through an aperture (not shown) in lever 47 and threaded into aperture (not shown) in shoulder 46. Clamping lever 47, as best seen in FIGURES 2 and 4, comprises an elongated main lever portion 51 and a pair to toe members 52 and 53 at each end thereof and extending substantially perpendicular thereto. As seen in FIGURE 4, toe 52 is somewhat longer than toe 53. Clamping lever 47, when mounted on pin 50, is positioned with respect to the tool holder so that toe 53 extends forward to a position adjacent tool 10. Toe 52 is adapted to be abutted by an adjustment screw 54 which is threaded into an aperture which extends transversely through block 24 from wall 23e and into the opening between shoulders 45 and 46. This aperture passes through body 24 near back wall 24b and substantially parallel thereto. By adjusting screw 54 against toe 52 of clamping lever 47, the lever is pivoted about pin 50 so as to cause toe 53 to forcibly abut tool 10, thereby holding the tool in place and preventing rotation of it with respect to the tool holder. As pointed out previously, toe member 52 is somewhat longer than toe member 53. The arrangement seen in FIGURE 4 is used when a relatively wide tool is to be used. When a narrower tool is used with the tool holder, pin 50 may be removed and clamping lever 47 reversed so as to have toe 53 abutted by screw 54 and so that toe 52 abuts the tool. This provides adequate adjustment of lever 47 over a rather wide range of tool widths with only a small range of pivotal movement of the lever, thus requiring only limted axial movement of the adjustment screw 54.

Tool holder 23 is adapted to be mounted on a machine tool by inserting a T-block generally designated at 56 into a similar T-slot on the cross-slide or similar movable surface of the machine tool. T-block 56, as best seen in FIGURES 5, 6, 7, and 9, comprises a base portion 57 and an upright portion 60 of a lesser width extending upward therefrom and centered thereon. A substantially cylndrical shoulder 61 is formed at the upper extent of upright portion 60 and extends perpendicular thereto. A threaded aperture 62 passes centrally through upright portion 60 and is coaxial with cylindrical shoulder 61. An elongated opening 63 of rectangular cross section extends into block 24 from base 24c and extends transversely through the tool holder from sides 24e to 24f. A cylindrical opening 64 of a diameter somewhat larger than the width of opening 63 also extends into block 24 from wall 24c and has its center at the center of opening 63, as seen in FIGURE 6. Opening 63 is of somewhat larger width than the width of upright portion 60 of T-block 56. T-block 56 is mounted with upright portion 60 extending into opening 63 and cylindrical shoulder portion 61 fitting into aperture 64. Since upright portion 60 is of a lesser width than the width of opening 64, limited rotational movement of the T-block is permitted with respect to body 24 and about the axis of aperture 64, this axis being substantially parallel to the beforesaid axis 22, and substantially perpendicular to the longitudinal axis of the T-block. An aperture 65 extends vertically through block 24 from top surface 24d and intersects opening 63. A locking screw 66 having a head 67 adjacent top surface 24d extends through aperture 65 and is threaded into aperture 62 of T-block 56. Thus by tightening screw 66, the T-block may be drawn into opening 63, thus locking T-block 56, and hence tool holder 24 to the cross-slide of a machine tool.

An aperture 70 extends into block 24 from rear wall 24b and intersects opening 63. A strong spring 71 is located in aperture 70 and forces a pin 72 against upright portion 60 of block 56 on one side of aperture 62. The force of spring 71 on pin 72 may be adjusted by an adjustment screw 73 which is threaded into the end of aperture 70 adjacent wall 24b. The force of pin 72 on T-block 56 tends to rotate it in a clockwise direction (as seen in FIGURE 6) with respect to block 24. A threaded aperture 74 also extends through block 24 from wall 24b and intersects opening 63 on the opposite side of the center of rotation of T-block 56. An adjustment screw 75 is threaded into aperture 74 and abuts upright portion 60 of T-block 56 tending to cause it to rotate in a counterclockwise direction, as seen in FIGURE 6. Thus it will be seen that the rotational position of tool holder 23 with respect to the machine tool, can be adjusted by movement of adjustment screw 75.

A threaded aperture 76 extends longitudinally through T-block 56 and is adapted to receive a lateral stop screw 77 which has a calibrated knob 78 attached to one end thereof. When tool holder 23 is mounted on the cross-slide of the machine tool, T-block 56 is inserted into a corresponding T-slot in the cross-slide. The position of the tool holder along the axis of the slot in the cross-slide may then be very accurately obtained by bringing the end of adjustment screw 77 into engagement with an abutment in the slot and then, by turning knob 78, the tool holder may be accurately positioned. Thereafter, screw 66 is tightened to draw the T-block 56 into opening 63 to lock the tool holder with respect to the cross-slide.

Thus it is seen that my tool holder can be easily mounted on the cross-slide of a machine tool by sliding the T-block into the corresponding slot of the cross-slide. The position of the tool holder along the axis of the slot in the cross-slide, which is also along the axis of rotation of the work piece, can be easily accomplished by the use of adjustment screw 77. The rotational position of the tool holder, about an axis substantially perpendicular to the mounting surface and parallel to axis 22, is readily obtained by adjusting screw 75. The tool holder may then be locked with respect to the cross-slide by tightening screw 65. Tool 10 is mounted on the tool holder by inserting dovetail block 27 into slot 26 and adjusting its height along axis 22, with respect thereto by adjustment screw 29. Locking screw 30 may then be tightened to maintain this adjusted height. Thereafter clamp adjusting screw 42 is tightened to draw plunger 34 into the block 24, thus locking dovetail block 27 with respect to the tool holder and at the same time bringing the side of tool 10 into engagement with the surfaces 43 and 44. Screw 54 is then tightened to bring clamping lever 47 into engagement with tool 10, thus providing further locking of the tool in its position.

As pointed out in connection with FIGURE 1, adjustment screw 29 (providing adjustment along axis 22) would be adjusted so as to bring cutting surface 12 of tool 10 into engagement with work piece 13 at point 21. When the tool is to be removed for sharpening or for replacement, it is necessary only to loosen screw 54 and clamp adjusting screw 42. Then block 27 and tool 10 may be removed for grinding or replacement. A grinding fixture similar to tool holder 23 is used and all dimensions are taken, using the ends of block 27 as a reference. Therefore, when the grinding has been completed, the tool may be returned to the tool holder, block 27 inserted in slot 26 and screws 42 and 54 tightened to lock the tool in place. No further adjustment is required at this time. If a circular tool has two cutting surfaces, such as are shown in FIGURES 1 and 2, it is necessary only to loosen screws 42 and 54, remove block 27 and rotate it 180°, and reinsert it, thereafter tightening screws 42 and 54. Here again, no adjustment of the height of the tool is required.

While tool 10 has been described as having an alternate cutting surface 12′, it may be desirable to substitute a separate but similar tool having a cutting surface located similarly to the position of surface 12′. If this is the case, it will be obvious that the substitution can be made by removing riser block 31 and then inserting the new tool. No further adjustment of height (along axis 22) is required.

It will be apparent to those skilled in the art that I have provided an improved tool holder which will result in a substantial reduction in setup time and also in the time required for changing of tools once the holder is set up. In addition, the height of the tool (the position along axis 22 of FIGURE 1) is easily adjusted when the tool is set up and thereafter requires no further adjustment. This ensures that the cutting surface of the tool always engages the work piece at the desired point 21, thus resulting in much better machining and in prolonged tool life. While it is generally desirable that the point 21 lie on the line 16 through the center of rotation of the work piece, it will be obvious that if for any reason it is found desirable to maintain point 21 in some other position along axis 22, such adjustment can be readily made by manipulation of screw 29. If the work piece is to be rotated in a reverse direction, a riser block having a height equal to twice the desired distance between line 15 and point 21 may be provided.

While I have shown a specific embodiment of my invention, it is to be understood that this is for illustrative purpose only and that, obviously, various modifications thereof will become apparent to those skilled in the art. It is therefore to be understood that the invention is to be limited only by the scope of the appended claims.

I claim as my invention:

1. A tool holder comprising: a body member having a dovetail slot formed therein and adapted to receive a tool carrying dovetail block, an elongated opening in said body member and extending in a transverse direction to said dovetail slot, a portion of said opening being co-extensive with a portion of said dovetail slot; an elongated clamping member having a dovetail slot formed on one side thereof, said clamping member being mounted in said opening in a position so that the dovetail slots in said body member and said clamping member are substantially coextensive; means for axially moving said clamping member in said opening to clamp the dovetail block in said dovetail slot; a clamp lever pivotally mounted on said body member and movable between first and second positions with respect thereto and being adapted to forceably engage a non-cutting portion of a tool held by the dovetail block to prevent movement of the tool with respect to the holder when said clamp lever is in one of said positions; and means for selectively locking said clamp lever in said one of said positions.

2. A tool holder comprising: a body member having a dovetail slot formed therein and adapted to receive a tool carrying dovetail block, an elongated opening in said body member and extending in a transverse direction to said dovetail slot, a portion of said opening being co-extensive with a portion of said dovetail slot; an elongated clamping member having a dovetail slot formed on one side thereof, said clamping member being mounted in said opening in a position so that the dovetail slots in said body member and said clamping member are substantially coextensive; means for axially moving said clamping member in said opening to clamp said dovetail block in said dovetail slot; a clamp lever pivotally mounted on said body member and movable between first and second positions with respect thereto and being adapted to forceably engage a non-cutting portion of a tool held by the dovetail block to prevent movement of the tool with respect to the holder when said clamp lever is in one of said positions; means for selectively locking said clamp lever in said one of said positions; means adapted for mounting said body member on the cross-slide of a material working machine; means associated with said mounting means for adjusting the lateral position of said body member with respect to the cross-slide; and means associated with said mounting means for adjusting the angular position of said body member with respect to the cross-slide.

3. A tool holder comprising: a body member having a slot formed therein and adapted to receive a tool carrying block, said slot and the block being so shaped that the block is normally retained in said slot; an elongated opening in said body member and extending in a transverse direction to said slot, a portion of said opening being co-extensive with a portion of said slot; an elongated clamping member having a similar slot formed on one side thereof, said clamping member being mounted in said opening in a position so that the slots in said body member and said clamping member are substantially co-extensive; means for moving said clamping member axially in said opening to clamp the block in said slot; a clamp lever pivotally mounted on said body member and movable between first and second positions with respect thereto and being adapted to forceably engage a non-cutting portion of a tool held by the block to prevent movement of the tool with respect to the holder when said clamp lever is in one of said positions; means for selectively locking said clamp lever in said one of said positions; means for mounting said body member on the cross-slide of a material working machine; means associated with said mounting means and adapted for adjusting the lateral position of said body member with respect to the cross-slide; and further means associated with said mounting means and said body member and adapted for adjusting the rotational position of said body member with respect to the cross-slide.

4. A tool holder comprising: a body member having a dovetail slot formed in one wall thereof; a dovetail block of smaller width than said dovetail slot and adapted to be normally retained in said slot, said block further being adapted for having a tool mounted thereon; an elongated opening in said body member and extending in a transverse direction to said dovetail slot, a portion of said opening being co-extensive with a portion of said dovetail slot; an elongated clamping member having a dovetail slot formed on one side thereof, said clamping member being mounted in said opening in a position so that the dovetail slots in said body member and said clamping member are substantially coextensive; means for moving said clamping member axially in said opening to lock said dovetail block in said dovetail slot, said axial movement causing said dovetail block to be drawn into said slot, said block being adapted to thereby bring portions of the tool into forceable engagement with said wall adjacent said dovetail slot to prevent movement of the tool with respect to said dovetail block; a clamping lever pivotally mounted on said body member and movable between first and second positions with respect thereto and being adapted to forceably engage a non-cutting portion of the tool held by said dovetail block to aid in preventing movement of the tool with respect to the holder when said clamp lever is in one of said positions; means for selectively locking said clamp lever in said one of said positions; means for mounting said body member on the cross-slide of a material working machine; means associated with said mounting means for adjusting the lateral position of said body member with respect to the cross-slide; and means associated with said mounting means for adjusting the rotational position of said body member about an axis substantially perpendicular to the cross-slide.

5. A tool holder comprising: a body member; a tool carrying member; means in said body member for receiving and retaining said tool carrying member; means adapted for mounting said body member on the mounting surface of a machine; means adapted for adjusting the position of said body member along a first axis with respect to the mounting surface; means adapted for adjusting the angular position of said body member about a second axis substantially perpendicular to said first axis; means for adjusting the position of said tool carrying member with respect to said body member and substantially in the direction of said second axis; first clamping means movable along a third axis substantially mutually perpendicular to said first and second axes and adapted to lock said tool carrying member with respect to said body member to prevent relative movement therebetween and to simultaneously lock said tool against said body member to prevent rotation of the tool with respect to said tool carrying member; and second clamping means acting in a direction substantially parallel to said first axis and adapted to provide further locking of said tool carrying member to prevent movement thereof with respect to said body member and to provide further locking of the tool to prevent rotation thereof with respect to said tool carrying member.

6. A tool holder comprising: a body member having a slot formed therein and adapted to receive a tool carrying block and being shaped so that the block is normally retained in said slot; an elongated opening in said body member and extending in a direction transverse to said slot, a portion of said opening being co-extensive with a portion of said slot; a clamping member having formed on one side thereof a slot similar to the slot in said body member, said clamping member being mounted in said opening for limited axial movement with respect thereto; means mounted in said elongated opening and normally biasing said clamping member to a position wherein the slots in said body member and said clamping member are substantially co-extensive means in said elongated opening for moving said clamping member with respect to said body member and in opposition to said biasing means, in the direction of the axis of said opening to clamp the tool carrying block in said slot; means for mounting said body member on the cross-slide of a machine; and means associated with said mounting means for adjusting the rotational position of said body member about an axis generally perpendicular to the cross-slide, said last named means including means normally biasing said body member to a first angular position about said axis, and means operable in opposition to the last named biasing means for selectively varying the angular position of said body member.

7. A tool holder comprising: a body member; a tool carrying member comprising a dovetail block having means adapted for attaching a tool thereto and adapted to provide angular adjustment of the tool about a first axis with respect to said tool carrying member; a dovetail slot in said body member for movably mounting said tool carrying member thereon, said slot extending along a second axis substantially perpendicular to said first axis; means adapted for mounting said body member on the mounting surface of a machine; means adapted for adjusting the position of said body member with respect to the mounting surface along an axis substantially parallel to said first axis; means adapted for adjusting the angular position of said body member about an axis substantially parallel to said second axis; means for adjusting the position of said tool carrying member with respect to said body member along said second axis; and means movable along a third axis substantially mutually perpendicular to said first and second axes and effective to lock said tool carrying member in said dovetail slot to prevent movement thereof with respect to said body member in a direction along said first, second and third axes, said last named means further being adapted to prevent angular movement of the tool about said first axis with respect to said tool carrying member.

8. A tool holder for use in holding a material working tool, the tool holder comprising: a body member having a plurality of walls, one of said walls having a dovetail slot formed therein; a dovetail block of smaller width and depth than said dovetail slot and adapted to be normally retained in said slot, said block further being adapted to have the tool mounted thereon so that when said block is positioned in the dovetail slot the tool extends adjacent said wall on at least one side of said dovetail slot; an elongated opening in said body member and extending in a direction transverse to said dovetail slot, a portion of said opening being co-extensive with a portion of said dovetail slot; an elongated clamping member having a generally similar dovetail slot formed on one side thereof and mounted in said elongated opening in said body member, said clamping member being axially movable in said body member and positionable therein so that the dovetail slots in said body member and said clamping member are substantially aligned and co-extensive; means for moving said clamping member axially in said opening to disalign the dovetail slots in said clamping member and said body member to thereby lock said dovetail block in said dovetail slot, such axial movement of said clamping member causing said dovetail block to be drawn into said slot due to the difference in dimension between said block and said slot, said block thereby bringing portions of the tool mounted thereon into forcible engagement with said wall adjacent said dovetail slot to prevent movement of the tool with respect to said dovetail block and the body member; and means for mounting said body member on the cross-slide of a material working machine.

References Cited in the file of this patent

UNITED STATES PATENTS

| 1,380,317 | Gustafson | May 31, 1921 |
| 2,510,544 | Bosket | June 6, 1950 |

FOREIGN PATENTS

| 1,160,885 | France | Mar. 10, 1958 |
| 1,190,702 | France | Apr. 6, 1959 |